(12) United States Patent
Cheng et al.

(10) Patent No.: US 9,012,083 B2
(45) Date of Patent: Apr. 21, 2015

(54) LITHIUM IRON PHOSPHATE BATTERY ELECTRODE AND METHOD FOR MANUFACTURING THE SAME

(75) Inventors: Dayang Cheng, Dongyang (CN); Guoguang Wang, Dongyang (CN); Daxin Bao, Dongyang (CN); Shijin He, Dongyang (CN)

(73) Assignee: Hengdian Group DMEGC Magnetic Limited Company, Dongyang (CN)

( * ) Notice: Subject to any disclaimer, the term of this patent is extended or adjusted under 35 U.S.C. 154(b) by 1114 days.

(21) Appl. No.: 12/641,278

(22) Filed: Dec. 17, 2009

(65) Prior Publication Data

US 2010/0167127 A1 Jul. 1, 2010

(30) Foreign Application Priority Data

Dec. 30, 2008 (CN) .......................... 2008 1 0163737

(51) Int. Cl.
*H01M 4/40* (2006.01)
*H01M 4/04* (2006.01)
*H01M 4/13* (2010.01)
*H01M 4/58* (2010.01)
*H01M 4/62* (2006.01)
*H01M 10/0525* (2010.01)

(52) U.S. Cl.
CPC .............. *H01M 4/13* (2013.01); *H01M 4/5825* (2013.01); *H01M 4/621* (2013.01); *H01M 10/0525* (2013.01); *Y02E 60/122* (2013.01)

(58) Field of Classification Search
None
See application file for complete search history.

(56) References Cited

U.S. PATENT DOCUMENTS

| 6,335,114 B1 * | 1/2002 | Ueshima et al. ................. 429/94 |
| 2005/0181283 A1 * | 8/2005 | Pugh et al. ............... 429/231.95 |
| 2007/0031730 A1 * | 2/2007 | Kawakami et al. ........ 429/218.1 |

* cited by examiner

*Primary Examiner* — Patrick Ryan
*Assistant Examiner* — Christopher Domone
(74) *Attorney, Agent, or Firm* — Martine Penilla Group, LLP

(57) ABSTRACT

The present invention relates to an electrode for the lithium iron phosphate battery and the manufacturing method thereof, and more particularly, to a coated electrode for the lithium iron phosphate with a smooth surface and without de-powder phenomenon and the manufacturing method thereof. The electrode provided in the present invention uses an arabic gum modified by adding silicone-based gel into the arabic gum. The lithium iron phosphate active material and the conductive agent in a certain ratio are added into the aforesaid modified arabic gums, after the mixing process, a liquid slurry with a certain viscosity is formed. Then, the liquid slurry is coated uniformly onto a positive current collector of aluminum foil or mesh, and followed by the process like drying, calendaring, cutting and etc. to form positive electrode plate. The electrode in the present invention has the characteristics of smooth surface and no de-powder phenomenon. The difficult-to-coat problem in manufacturing lithium ion battery electrode with lithium iron phosphate in the prior art is overcome.

6 Claims, 1 Drawing Sheet

LITHIUM IRON PHOSPHATE BATTERY ELECTRODE AND METHOD FOR MANUFACTURING THE SAME

CLAIM OF PRIORITY TO RELATED APPLICATION

The present application is claiming priority Under 119 to Chinese Patent Application No. 200810163737.X, filed on Dec. 30, 2008, entitled, "ELECTRODE FOR LITHIUM IRON PHOSPHATE BATTERY AND METHOD FOR MANUFACTURING THE SAME", the content of which is incorporated herein by reference.

FIELD OF THE INVENTION

The present invention relates to a lithium iron phosphate battery electrode and a method for manufacturing the same, and more particularly, to a coated lithium iron phosphate battery electrode with smooth surface and without de-powder phenomenon and a method for manufacturing the same, and a lithium ion battery comprising the said electrode.

TECHNICAL BACKGROUND OF THE INVENTION

During the current process for producing the conventional lithium ion battery with lithium cobaltate, lithium manganate, lithium nickel-cobalt-manganate (triple-element material), etc. as the active material for the positive electrode, PVDF (polyvinylidene fluoride) as binder and the organic solvent NMP (N-methyl pyrrolidone) as solvent are used when the positive electrode is typically prepared by a certain manufacturing process. However, when lithium iron phosphate is used as the active material of the positive electrode, the low tap density and the high surface area of lithium iron phosphate (compared to lithium cobaltate or lithium manganate) result in poor processability, serious de-powder phenomenon and low yield when PVDF as binder is used to prepare the positive electrode, which is the technical bottle-neck in the production of lithium ion battery with lithium iron phosphate. Meanwhile, PVDF requires organic solvents (mainly N-methyl pyrrolidone) to dissolve, thus pollution, recovery and treatment of the solvent require high production cost.

Compared with non-water soluble binder, water-based binder has become an important development trend in binder industry because of its good characteristics such as no organic solvent release, no environmental pollution, low cost, non-combustible, safety in using and the like. For instance, Chinese publication number CN1960040A discloses the use of the acrylic polymer as binder, and Chinese publication number CN1485940A discloses the water-based binder prepared by mixing CMC, etc. as thickening agent, styrene-butadiene rubber emulsion, etc. as binder and water soluble silane coupling agent, etc. as additive. So far, the conventional water-based binder includes phenol aldehyde resins, amine resins, polyacrylates, rubber latex, ethylene-vinyl acetates, etc. This binder generally contains hydrophilic groups, and the research reveals that the hydrophilic groups and water solvent have tremendous influence on the performance of lithium ion battery. The main reason is that it is hard to remove the water molecules remained in the electrode of lithium battery when using this binder. During the process of charge-discharge after assembling lithium battery, the water molecules will decompose to produce gas at a certain voltage, and further react with the electrolyte in lithium battery, which causes the problems on gas-expansion of lithium battery and too fast degradation of capacity. Therefore, it is the key for lithium ion battery to obtain success in commercialization that how to eliminate the influence of hydrophilic groups and water solvent on the performance of the battery.

At the same time, because of the poor conductivity of the positive electrode active material, such as lithium cobaltate, lithium manganate, lithium ferrous phosphate and so on, it is necessary to add some conductive agents, such as graphite and conductive carbon black, to ensure the conductivity of the electrode. Therefore, when choosing a binder, it is also very important to select a binder without influence on the conductivity of the electrode.

Due to its good using effect, a lithium iron phosphate electrode has an extensive application in making lithium battery. However, the current manufacturing process for lithium iron phosphate electrode still needs to be improved in the aspect of forming electrode and the like, and it is necessary to investigate deeply on selecting a good binder for preparing lithium iron phosphate electrode. According to the previous research results, the better effects can be obtained when an arabic gum is used as the binder in manufacturing electrode, but the prepared electrode still has the defects of surface smoothness and de-powder phenomenon. Therefore, it is necessary to further develop a solution to improve electrode smoothness and to decrease de-powder phenomenon without decreasing the overall performance of the electrode.

SUMMARY OF THE INVENTION

To solve the problems mentioned above, the present invention is aimed to solve the difficult-to-coat problem and the like in manufacturing the electrode of lithium iron phosphate lithium ion battery in the prior art, and to provide a lithium iron phosphate battery with a silicone-based gel modified arabic gum to improve the smoothness of the electrode surface and to decrease the de-powder phenomenon caused by arabic gum as binder.

The inventors found that a modified arabic gum, which is a mixture prepared by mixing a silicone-based gel and arabic gum, has good properties. Lithium iron phosphate battery electrode prepared by using this modified arabic gum as the binder has the excellent effects of smooth surface, no de-powder phenomenon, and perfect binding ability.

The experimental results show that it is difficult to meet the demand in production if using arabic gum alone as the binder, yet it is surprising that the silicone-based gel increases the overall performance of arabic gum after it is added into arabic gum. The amount of the silicone-based gel in arabic gum can be selected according to actual need, thus, the person skilled in the art can discover that the performance of using arabic gum alone can be improved as long as the silicone-based gel is added, even if very little of the silica-gel based gel is added.

The "modified arabic gum" in the present invention refers to the material obtained by adding the silicone-based gel into arabic gum. For there is no chemistry reaction between arabic gum and silicone-based gel, just mixing them well can do the job. The "modified arabic gum" can be prepared by adding a certain amount of the silicone-based gel into arabic gum that is capable of dissolving in water, to form the modified arabic gum binder. Of course, the person skilled in the art can also consider of preparing this material by other means.

When the modified arabic gum compares with arabic gum or other polymer binders, this multi-component gum binder has obvious advantages such as hydrophobicity, polarity and flexibility, etc. By using de-ionized water as solvent, it is easy to solve the difficult-to-coat problem of lithium iron phosphate, to avoid environmental pollution caused by the organic solvent volatilization, and to control the influence of water solvent on the performance of battery effectively, which plays a significant role in promoting the industrialization of lithium iron phosphate lithium ion battery.

During the process of preparing electrode, the lithium iron phosphate active material and the conductive agent in a certain ratio are added into one or more water soluble modified arabic gums, after the mixing process, a liquid slurry with a certain viscosity is formed. Then, the liquid slurry is coated uniformly onto a positive current collector of aluminum foil or mesh, and followed by the process like drying, calendering, cutting, etc. to form a positive electrode. It is effective to solve the problems on the difficult-to-coat, pollution caused by the organic solvent and the high cost of recovery and treatment in the production of the lithium iron phosphate lithium ion battery electrode.

Specifically, the lithium iron phosphate battery electrode provided by the present invention comprises a current collector and an active material layer coated on it. The active material layer comprises an active material, a binder and a conductive agent, in which the active material is lithium iron phosphate, and the binder is the modified arabic gum.

Preferably, the lithium iron phosphate electrode according to the present invention contains 85~95 wt % of lithium iron phosphate, 2~8 wt % of the modified arabic gum and 2~8 wt % of the conductive agent on basis of the weight of the active material layer.

Preferably, the modified arabic gum is prepared by adding a silicone-based gel into a water soluble arabic gum.

Preferably, the compacted density of the lithium iron phosphate battery electrode is 2.0~2.3 g/cm$^3$ according to the present invention. The present invention also provides a lithium ion battery comprising a positive electrode, a negative electrode, an electrolyte solution and a separator, wherein the positive electrode comprises a positive current collector and a positive active layer coated on the current collector. The positive active material layer comprises a positive active material, a binder and a conductive agent, in which the positive active material is lithium iron phosphate and the binder is the modified arabic gum.

The lithium ion battery preferably contains 85~95 wt % of lithium iron phosphate, 2~8 wt % of the modified arabic gum and 2~8 wt % of the conductive agent on basis of the weight of the positive active material layer.

The lithium ion battery preferably uses the modified arabic gum as binder for positive electrode which is obtained by adding a silicone-based gel into a water soluble arabic gum. The proportion of silicone-based gel and arabic gum in the modified arabic gum is (10-45) wt %:(90-55) wt %, prefer (12-30) wt %:(88-70) wt %, examples can be 20 wt %:80 wt %, 16 wt %:84 wt %, 30 wt %:70 wt %, 12 wt %:88 wt %, 15 wt %:85 wt %, 20 wt %:80 wt %.

The positive electrode of the lithium ion battery preferably has the compacted density of 2.0~2.3 g/cm$^3$.

The present invention further provides a method for manufacturing the lithium iron phosphate electrode comprising the following steps:
  A. mixing 2~8 wt % of the modified arabic gum, 2~8 wt % of the conductive agent and 85~95 wt % of lithium iron phosphate in ratios on basis of the dry weight of the mixture, then stirring uniformly to form a mixture, and adjusting the viscosity of the slurry to 3500±500 mPa·s;
  B. coating an electrode with the aforesaid mixture, the drying temperature is 60~130° C. when coating; and
  C. drying the coated electrode in a vacuum oven at 100~120° C. for 8~10 hours; then calendering the dried electrode to the compacted density of 2.0~2.3 g/cm$^3$, and forming the positive electrode by cutting.

Preferably, according to the method for manufacturing lithium iron phosphate battery electrode in the present invention, wherein arabic gum is formulated to 5 wt % of the modified arabic gum solution when used in step A, and the adding amount of the arabic gum is calculated based on the amount of the solid arabic gum during mixing.

Preferably, according to the method for manufacturing lithium iron phosphate battery electrode in the present invention, wherein the mixing in step A is adding lithium iron phosphate and the conductive agent into the modified arabic gum solution successively.

Preferably, according to the method for manufacturing lithium iron phosphate battery electrode in the present invention, wherein when the coating in step B is one-side coating, the drying temperature is 60~90° C.

Preferably, according to the method for manufacturing lithium iron phosphate battery electrode in the present invention, wherein when the coating in step B is two-side coating, the dry temperature is 100~130° C.

Preferably, according to the method for manufacturing lithium iron phosphate battery electrode in the present invention, wherein the single side area density of the coated electrode is 125~200 g/m$^2$ in step B.

According to the method for manufacturing lithium iron phosphate electrode in the present invention, the conductive agent can be conductive carbon black, acetylene black, Vapor Grown Carbon Fiber (VGCF), and etc.

In the present invention, the reason for selecting the modified arabic gum as binder is that the modified arabic gum has good adherence, good solubility, compatibility with most of the natural glues, good heat stability, and good acid-resistance, which is incomparable to other water soluble polymer binders. Moreover, a few ions such as $K^+$, $Na^+$, and $Mg^{2+}$ contained in the modified arabic gum has higher ionic conductivity, which can eliminate the influence of binder on the conductivity of active material effectively. Particularly, compared to other polymer binders, the multi-constituent modified arabic gum as binder obtained by adding the silicone-based gel into the water soluble arabic gum in a certain proportion has obvious advantages, such as hydrophobicity, polarity, flexibility and so on. Particularly, using the modified arabic gum in manufacturing lithium iron phosphate electrode can improve obviously the surface smoothness of the electrode, and suppress de-powder phenomenon and brittle phenomenon of the electrode.

The lithium battery electrode prepared according to the method in the present invention has smooth surface and no de-powder phenomenon. The battery with the lithium iron phosphate positive electrode prepared by the manufacturing method in the present invention has the properties of good stability on charge-discharge process, high discharge plateau and so on. The stability of charge-discharge process exhibits that the retention rate of capacity is higher than 85% after 2000 cycles in the condition of charging at 2 C and discharging at 5 C.

According to the present invention, the modified arabic gum as binder and de-ionized water as solvent are used in the manufacturing method of lithium iron phosphate battery electrode, which can solve the difficult-to-coat problem in manufacturing lithium iron phosphate electrode, avoid the environmental pollution caused by the organic solvent volatilization, and effectively control the influence of water solvent on the performance of the battery. Therefore, it will play a significant role in promoting the industrialization of the lithium iron phosphate lithium ion battery. In the process of preparing the slurry, the viscosity of the resulted slurry needs to be controlled in the range of 3000~4000 mPa·s. If the viscosity is lower, the fluidity of the slurry will become too strong and cause more difficulty in controlling the thickness of electrode during the coating process, which leads to uneven thickness of the electrode. If the viscosity is higher, the fluidity of the slurry is so week and the drying rate of coating is so high that the electrode will crack.

In the coating process, it is necessary to control the drying temperature for coating electrode, which should be in the range of 60~130° C. The preferred drying temperature is in the range of 60~100° C. for one-side coating process. For two-side coating, alternatively both sides are dried simultaneously after being coated, and the preferred drying temperature is in the range of 100~130° C. It is particularly preferably to dry the electrode at lower temperature after the first side is coated, and then dry the electrode at higher temperature after the second side is coated, preferably dry in the range of 100~130° C.

The area density of the coated electrode needs to be controlled in the coating process, and the single side area density should be in the range of 125~200 g/m$^2$.

The coated electrode is dried in the vacuum oven at 100~120° C. for 8~10 hours.

The dried electrode is calendered, and the compacted density is in the range of 2.0~2.3 g/cm$^3$.

The preferred operating steps in the present invention are generally as follows: 5% colloid solution is formulated by dissolving the gum binder in de-ionized water. Then the uniform slurry with a viscosity of 3500±500 mPa·s is prepared by mixing the binder, the conductive agent and lithium iron phosphate in a proportion of binder: conductive agent: lithium iron phosphate=(2~8):(2~8):(85~95) (by mass); when coating, the drying temperature needs to be controlled at 60~100° C. during coating the first side, and the drying temperature needs to be controlled at 100~130° C. during coating the second side. After coating, the electrode is put into a vacuum oven under the temperature of 100~120° C. to dry for 8-10 hours. The dried electrode is calendered to form electrode with the compacted density of 2.0-2.3 g/cm$^3$, and then cut into the positive electrode plate.

Compared to the prior art, the present invention has the following advantages: Since the water soluble modified arabic gum as binder and de-ionized water as solvent are used, it solves the difficult-to-coat problem in manufacturing lithium iron phosphate electrodes. There is no environmental pollution caused by solvent volatilization, and it plays a significant role in promoting the industrialization of lithium iron phosphate lithium battery.

DETAILED DESCRIPTION OF THE INVENTION

The technical features of the present invention will be further illustrated by the following embodiments which however do not limit the scope of the present invention.

In the present invention, unless otherwise noted, all parts, percentages are in weight unit, and all the devices and raw materials, etc. are commercial available or commonly used in the art.

EXAMPLE 1

90 wt % of lithium iron phosphate, 5 wt % of conductive carbon black and 5 wt % of the modified arabic gum binder are used as raw materials. The proportion of silicone-based gel and arabic gum in the modified arabic gum is 20 wt %:80 wt %.

The modified arabic gum binder is dissolved in de-ionized water to form 5 wt % of the colloid solution; and then the conductive carbon black and lithium iron phosphate are added in turn into the colloid solution, the amount of which is calculated based on the solid modified arabic gum, stirred uniformly, and then the appropriate amount of de-ionized water is added to adjust the viscosity of the slurry to 3500 mPa·s. The prepared slurry is used to coat after being filtered and vacuumed. For one-side coating, the temperature is set at 60° C., and the area density is set at 125 g/m$^2$. For two-side coating, the temperature is set at 120° C., and the area density is set at 250 g/m$^2$. When finishing coating, the electrode is put into a vacuum oven to dry at 120° C. for 8 hours. The electrode with the compacted density of 2.1 g/cm$^3$ is obtained by calendaring the dried electrode and followed by cutting. The 1100 mAh power lithium ion battery of 18650-type with lithium iron phosphate is assembled with the positive electrode mentioned above and the carbon negative electrode G06 (manufactured by Ningbo Shanshan new material technical limited corporation in P. R. China). During the assembly process, no de-powder phenomenon occurs on the positive electrode, and the yield is high. The battery is tested according to the following steps (the results are shown in FIG. 1):

Testing device: NEWARE BTS5V/6A high precision battery testing system;
Set steps:
1. being stationary for 1 minute;
2. charging at the constant current of 2200 mA with the voltage limit of 3.65V, then charging at the constant voltage of 3.65V with the current limit of 20 mA;
3. being stationary for 10 minutes;
4. discharging at the constant current of 5500 mA with the voltage limit of 2.00V;
5. being stationary for 10 minutes;
6. shifting to step 2, 2000 cycling;
7. over

|  |  | capacity retention rate % |
|---|---|---|
| Initial capacity: | 1100 mAh |  |
| 500$^{th}$ capacity: | 1045 mAh | 95.0 |
| 1000$^{th}$ capacity: | 1034 mAh | 94.0 |
| 1500$^{th}$ capacity: | 1002 mAh | 91.1 |
| 2000$^{th}$ capacity: | 975 mAh | 88.6 |

Figure 1:
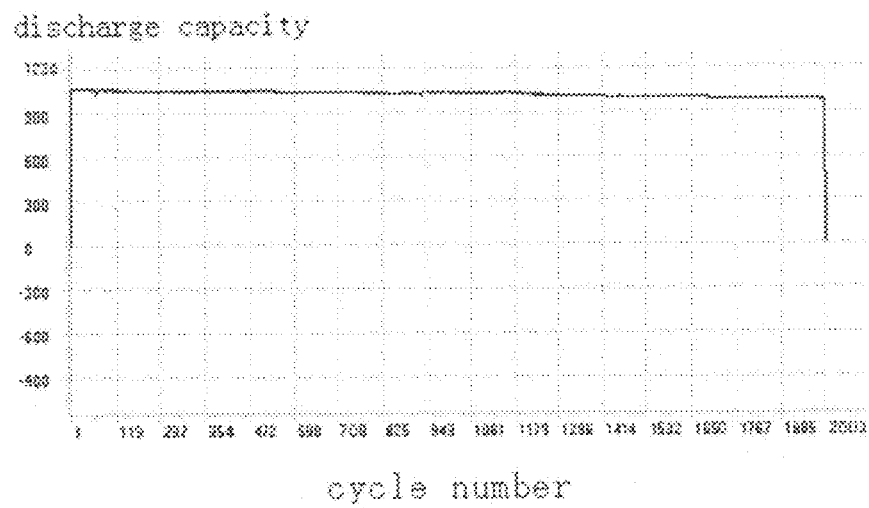
FIG. 1 is the circulation graph of hydrodynamic type 18650 lithium iron phosphate lithium ion battery according to the first example in the present invention.

It can be seen from the FIG. 1 that the performance of charge-discharge is stable for the lithium battery in this example, wherein the capacity retention rate is 88.6% after 2000 cycles in the conditions of charging at 2 C and discharging at 5 C.

EXAMPLE 2

91 wt % of lithium iron phosphate, 3 wt % of conductive carbon black and 6 wt % of the modified arabic gum binder are used as raw materials. The proportion of silicone-based gel and arabic gum in the modified arabic gum is 16 wt %:84 wt %. The modified arabic gum binder is dissolved in de-ionized water to form 5 wt % of the colloid solution; and then the conductive carbon black and lithium iron phosphate are added in turn into the colloid solution, the amount of which is calculated based on the solid modified arabic gum, stirred uniformly, and then an appropriate amount of the de-ionized water is added to adjust the viscosity of the slurry to 3800 mPa·s. The prepared slurry is used to coat after being filtered and vacuumed. For one-side coating, the temperature is set at 80° C., and the area density is set at 180 g/m$^2$. For two-side coating, the temperature is set at 130° C., and the area density is set at 360 g/m$^2$. When finishing coating, the electrode is put into a vacuum oven to dry at 120° C. for 10 hours. The electrode with the compacted density of 2.2 g/cm$^3$ is obtained by calendaring the dried electrode and followed by cutting. 3 Ah volumetric type lithium ion battery of 22650-type with lithium iron phosphate is assembled with the positive electrode mentioned above and the carbon negative electrode AGP-3 (manufactured by Shenzhen BTR new energy materials Inc. in P. R. China). During the assembly process, no de-powder phenomenon occurs on the positive electrode, and the yield is high. The battery is tested according to the following steps (the results were shown in FIG. 2):

Testing device: NEWARE BTS5V/6A high precision battery testing system;
Capacity design: 3000 mAh, discharge capacity: 3079 mAh;
Set steps:
1. being stationary for 1 minute;
2. charging at the constant current of 600 mA with the voltage limit of 3.7V, then charge at constant voltage of 3.7V with the current limit of 30 mA;
3. being stationary for 10 minutes;
4. discharging at the constant current of 600 mA with the voltage limit of 2.00V;
5. being stationary for 10 minutes;
6. over.

Figure 2:
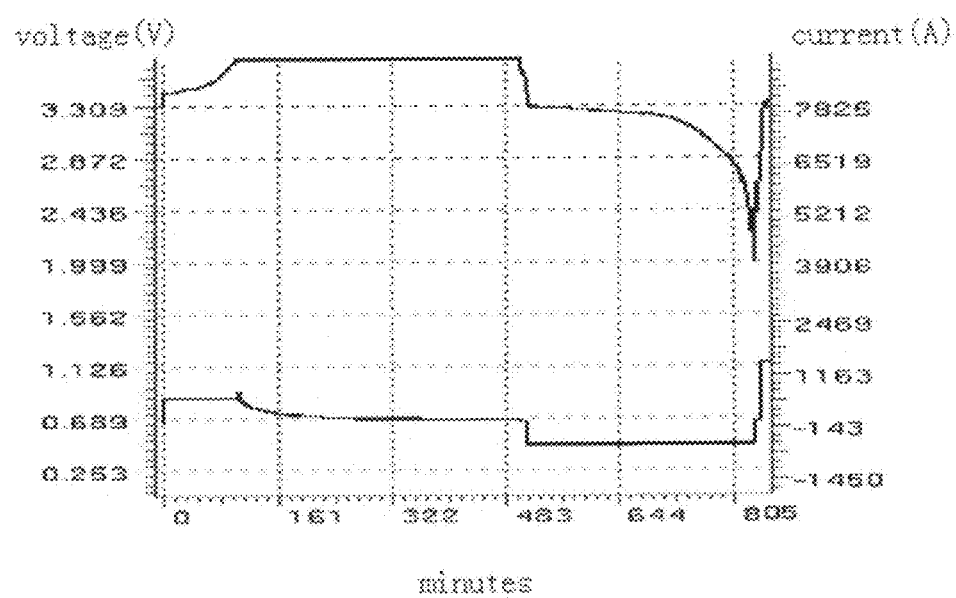
FIG. 2 is the charge-discharge curve of hydro-capacity type 26650 lithium iron phosphate lithium ion battery according to the second example in the present invention.

It can be seen from FIG. 2 that the performance of charge-discharge is stable for the lithium battery in example 2, wherein the initial charge capacity is 3310 mAh, the discharge capacity is 3079 mAh, and the initial charge-discharge efficiency is more than 93%, which meets the demand in actual use.

EXAMPLE 3

95 wt % of lithium iron phosphate, 3 wt % of acetylene black and 2 wt % of the modified arabic gum binder are used as raw materials. The proportion of silicone-based gel and arabic gum in the modified arabic gum is 30 wt %:70 wt %. The modified arabic gum binder is dissolved in de-ionized water to form 5 wt % of the colloid solution, and then the acetylene black and lithium iron phosphate are added in turn into the colloid solution, the amount of which is calculated based on the solid modified arabic gum, stirred uniformly, and then an appropriate amount of the de-ionized water is added to adjust the viscosity of the slurry to 3600 mPa·s. The prepared slurry is used to coat after being filtered and vacuumed. For one-side coating, the temperature is set at 70° C., and the area density is set at 150 g/m$^2$. For two-side coating, the temperature is set at 110° C., and the area density is set at 300 g/m$^2$. When finishing coating, the electrode is put into a vacuum oven to dry at 100° C. for 10 hours. The electrode with the compacted density of 2.1 g/cm$^3$ is obtained by calendaring the dried electrode and followed by cutting, which has smooth surface without de-powder phenomenon.

EXAMPLE 4

90 wt % of lithium iron phosphate, 2 wt % of nano-carbon and 8 wt % of the modified arabic gum binder are used as raw materials. The proportion of silicone-based gel and arabic gum in the modified arabic gum is 12 wt %:88 wt %. The modified arabic gum binder is dissolved in de-ionized water to form 5 wt % of the colloid solution, and then the nano-carbon and lithium iron phosphate are added into the colloid solution, the amount of which is calculated based on the solid modified arabic gum, stirred uniformly, and then an appropriate amount of de-ionized water is added to adjust the viscosity of the slurry to 4000 mPa·s. The prepared slurry is used to coat after being filtered and vacuumed. For one-side coating, the temperature is set at 90° C., and the area density is set at 200 g/m$^2$. For two-side coating, the temperature is set at 120° C., and the area density is set at 400 g/m$^2$. When finishing coating, the electrode is put into a vacuum oven to dry at 120° C. for 10 hours. The electrode with the compacted density of 2.3 g/cm$^3$ is obtained by calendaring the dried electrode and followed by cutting, which has smooth surface without de-powder phenomenon.

EXAMPLE 5

85 wt % of lithium iron phosphate, 8 wt % of conductive carbon black and 7 wt % of the modified arabic gum binder are used as raw materials. The proportion of silicone-based gel and arabic gum in the modified arabic gum is 15 wt %:85 wt %. The modified arabic gum binder is dissolved in de-ionized water to form 5 wt % of the colloid solution, and then the conductive carbon black and lithium iron phosphate are added in turn into the colloid solution, the amount of which is calculated based on the solid modified Arabic gum, stirred uniformly, and then an appropriate amount of de-ionized water is added to adjust the viscosity of the slurry to 3200 mPa·s. The prepared slurry is used to coat after being filtered and vacuumed. For one-side coating, the temperature is set at 70° C., and the area density is set at 150 g/m$^2$. For two-side coating, the temperature is set at 100° C., and the area density is set at 300 g/m$^2$. When finishing coating, the electrode is put into a vacuum oven to dry at 120° C. for 10 hours. The electrode with the compacted density of 2.0 g/cm$^3$ is obtained by calendaring the dried electrode and followed by cutting, which has smooth surface without de-powder phenomenon.

EXAMPLE 6

90 wt % of lithium iron phosphate, 5 wt % of conductive carbon black and 5 wt % of the modified arabic gum binder are used as raw materials. The proportion of silicone-based gel and arabic gum in the modified arabic gum is 20 wt %:80 wt %. The modified arabic gum binder is dissolved in de-ionized water to form 5 wt % of the colloid solution, and then the conductive carbon black and lithium iron phosphate are added in turn into the colloid solution, the amount of which is calculated based on the solid modified arabic gum, stirred uniformly, and then an appropriate amount of de-ionized water is added to adjust the viscosity of the slurry to 3000 mPa·s. The prepared slurry is coated after being filtered and vacuumed. For one-side coating, the temperature is set at 100° C., and the area density is set at 130 g/m$^2$. For two-side coating, the temperature is set at 120° C., and the area density is set at 260 g/m$^2$. When finishing coating, the electrode is put into a vacuum oven to dry at 120° C. for 10 hours. The electrode with the compacted density of 2.0 g/cm³ is obtained by calendaring the dried electrode and followed by cutting, which has smooth surface without de-powder phenomenon.

COMPARATIVE EXAMPLE 1

92 wt % of lithium iron phosphate, 5 wt % of conductive carbon black, 2 wt % of styrene-butadiene rubber (SBR), and 2.0 wt % of sodium carboxymethyl cellulose CMC) are used as raw materials. The CMC is dissolved in de-ionized water to form 10 wt % of the colloid solution, followed by adding a certain amount of SBR in ratios, and mixed uniformly. Then the conductive carbon black and lithium iron phosphate are added in turn into the colloid solution, stirred uniformly. An appropriate amount of de-ionized water is added to adjust to 3500 mPa·s. The prepared slurry is used to coat after being filtered and vacuumed. For one-side coating, the temperature is set at 80° C., and the area density is set at 120 g/m². For two-side coating, the temperature is set at 120° C., and the area density is set at 240 g/m². A serious problem of de-powder phenomenon occurs during the coating process, thus, it is not suitable for coating lithium iron phosphate material.

COMPARATIVE EXAMPLE 2

90 wt % of lithium iron phosphate, 3 wt % of conductive carbon black and 7 wt % of arabic gum are used as raw materials. The arabic gum is dissolved in de-ionized water to form 5 wt % of the colloid solution, and then the conductive carbon black and lithium iron phosphate are added in turn into the colloid solution, the amount of which is calculated based on the solid gum, and stirred uniformly. An appropriate amount of de-ionized water is added to adjust the viscosity of the slurry to 3500 mPa·s. The prepared slurry is used to coat after being filtered and vacuumed. For one-side coating, the temperature is set at 80° C., and the area density is set at 120 g/m². For two-side coating, the temperature is set at 120° C., and the area density is set at 240 g/m². During the coating process, the fluidity of the slurry is poor, and the obtained electrode after drying has a rough surface with cracks. Moreover, there is a de-powder phenomenon. Therefore, it is not suitable for coating the lithium iron phosphate material.

The modified arabic gum binder used in the present invention has the obvious advantages such as hydrophobicity, polarity, flexibility, etc. compared with the arabic gum or other polymer binders. Moreover, the de-ionized water as solvent in the present invention solves the difficult-to-coat problem in manufacturing lithium iron phosphate electrode, eliminates environmental pollution caused by the solvent volatilization, and is able to control the influence of the water solvent on the performance of battery effectively. Therefore, it will play a significant role in promoting the industrialization of lithium ion battery with lithium iron phosphate.

While the present invention has been described in detailed and some examples have been cited, it is obvious to the person skilled in the art that various variations or amendments can be made without departing the scope and spirit of the invention.

What is claimed is:

1. A lithium iron phosphate battery electrode, characterized in that, the electrode comprises a current collector and an active material layer coated on the current collector; the active material layer comprises an active material, a binder, and a conductive agent, wherein the active material is lithium iron phosphate, and the binder is a modified arabic gum, and a content of the modified arabic gum is in the range of 5 wt % to 8 wt %; wherein the modified arabic gum is a mixture of silicone-based gel and arabic gum, and a proportion of the silicone-based gel and the arabic gum in the modified arabic gum is (10-45) wt %:(90-55) wt %.

2. The lithium iron phosphate battery electrode according to claim 1, characterized in that, the mixture of silicone-based gel and arabic gum is formed by adding silicone-based gel into water soluble arabic gum.

3. The lithium iron phosphate battery electrode according to claim 2, characterized in that, the compacted density of the electrode is in the range of 2.0~2.3g/cm³.

4. A lithium ion battery, comprising a positive electrode, a negative electrode, an electrolyte solution and a separator, in which, the lithium iron phosphate battery electrode as set forth in claim 1 is used.

5. A lithium ion battery, comprising a positive electrode, a negative electrode, an electrolyte solution and a separator, in which, the lithium iron phosphate battery electrode as set forth in claim 2 is used.

6. A lithium ion battery, comprising a positive electrode, a negative electrode, an electrolyte solution and a separator, in which, the lithium iron phosphate battery electrode as set forth in claim 3 is used.

* * * * *